United States Patent [19]

Hotta

[11] Patent Number: 4,587,468
[45] Date of Patent: May 6, 1986

[54] SUDDEN STOP CIRCUIT FOR A BRUSHLESS MICROMOTOR

[75] Inventor: Toshihiro Hotta, Uji, Japan

[73] Assignee: Kabushiki Kaisha Morita Seisakusho, Kyoto, Japan

[21] Appl. No.: 692,832

[22] Filed: Jan. 18, 1985

[30] Foreign Application Priority Data

Jan. 25, 1984 [JP] Japan .................. 59-8911[U]

[51] Int. Cl.$^4$ .................................. H02P 3/00
[52] U.S. Cl. .................... 318/362; 318/254
[58] Field of Search ............... 318/138, 254 A, 254, 318/362, 439

[56] References Cited

U.S. PATENT DOCUMENTS 3,864,610  2/1975  Kawamoto et al. ........... 318/254 X
4,438,377  3/1984  Sakai et al. .................... 318/254
4,521,723  6/1985  Claude .......................... 318/254 X

FOREIGN PATENT DOCUMENTS 59-50785  3/1984  Japan ........................ 318/362
1551738   8/1979  United Kingdom ........ 318/362

Primary Examiner—William M. Shoop, Jr.
Assistant Examiner—Bentsu Ro
Attorney, Agent, or Firm—Koda and Androlia

[57] ABSTRACT

A sudden stop circuit for a brushless micromotor comprising a means for detecting the off state of the on/off switch of the brushless micromotor and a means for applying a locking pulse signal to at least one motor coil for a specified period depending on the off state detection signal generated by the detection means, whereby the motor rotor is braked by the electromagnetic force generated in the motor coil by the locking pulse signal. This circuit is compact and can apply great braking force to stop the motor in an extremely short time.

1 Claim, 2 Drawing Figures

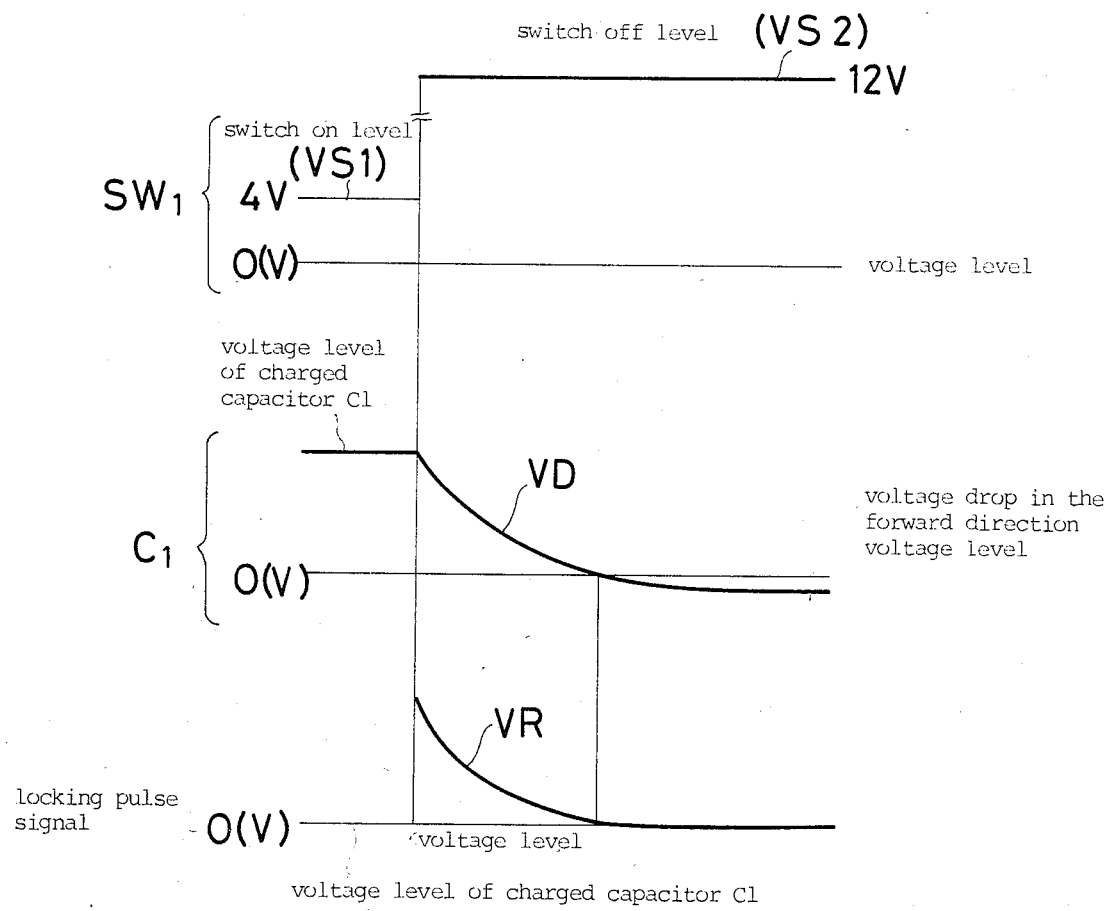

SUDDEN STOP CIRCUIT FOR A BRUSHLESS MICROMOTOR

BACKGROUND OF THE INVENTION

1. Field of the Invention

The present invention relates to a circuit for suddenly stopping a brushless micromotor used for a dental handpiece for example.

2. Prior Art

The conventional sudden stop circuit for a brushless micromotor has a construction in which plural motor coils are short-circuited by relays or switches depending on a motor stop signal or has a construction in which its rotor is suddenly stopped by applying a rotor position locking voltage. In the former case, a large PC board space is necessary for the relays or switches. In the latter case, the rotor rotates up to 180 degrees when power is turned on. The rotor cannot be suddenly stopped since a current flows through a coil while power is turned on. In addition, the rotor cannot be released from locking after it is locked.

SUMMARY OF THE INVENTION

It is therefore an object of the present invention to provide a compact circuit which detects a motor stop signal, that is, the off state of an on/off switch, to suddenly stop motor rotation.

The object of the present invention is attained by providing a circuit which includes a means for detecting the off state of the on/off switch of a brushless micromotor and a means for applying a locking pulse signal to at least one motor coil for a specified period depending on the off state detection signal generated by the detection means, whereby the motor is braked by the electromagnetic force generated in the motor coil by the locking pulse signal.

Since the locking pulse signal is applied to the motor coil to suddenly stop the motor, a large locking voltage can be applied and thus the motor can be stopped in a short time. In addition, a compact circuit such as a capacitor charging/discharging circuit can be used instead of conventional relays or switches. Therefore, the apparatus including the circuit can be made compact. Furthermore, since the locking time is limited to the specified period determined by the discharge of the capacitor, no power loss is generated inside the motor and the motor can be released from its locking state. Due to this releasing, the rotor of the motor can be rotated by hand as desired after it is stopped. Therefore, the circuit of the present invention can be advantageously used for motors of dental handpieces, which need to be released while they are stationary. An embodiment of the present invention will be apparent from the following description and the accompanying drawings.

BRIEF DESCRIPTION OF THE DRAWINGS

FIG. 2 is a signal waveform diagram showing the relationship among the states of the switch SW1, the voltage levels of the capacitor C1 and the locking pulse signal shown in the circuit diagram of FIG. 1.

DETAILED DESCRIPTION OF THE INVENTION

Figure 1:
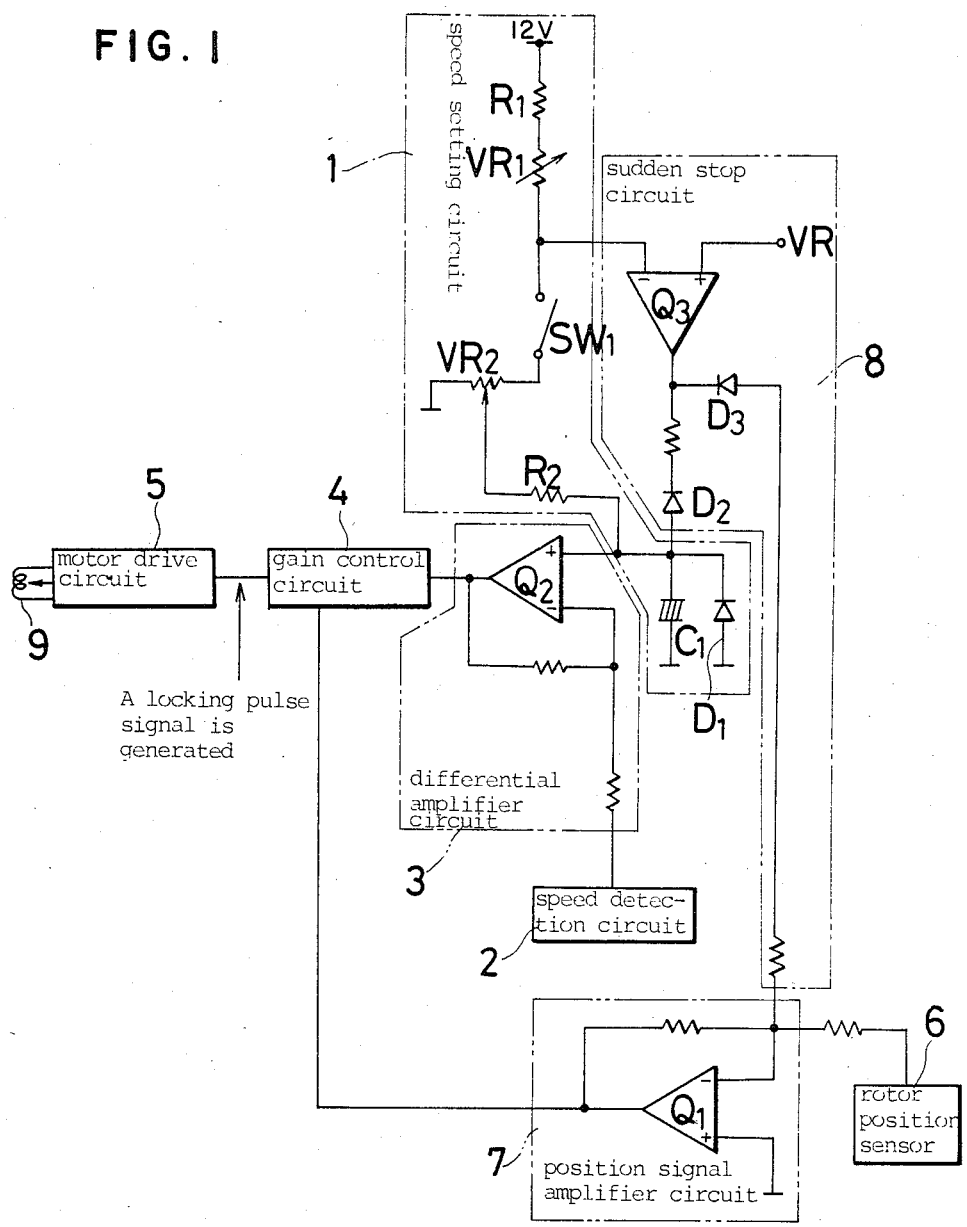
FIG. 1 is a circuit diagram showing an embodiment of the present invention.

FIG. 1 shows an embodiment of the present invention applied to a brushless micromotor drive circuit including an automatic rotation speed control circuit. The motor speed setting circuit 1 in the circuit diagram includes a resistor R1 and a variable resistor VR1 to set the maximum motor speed voltage. SW1 represents a motor on/off switch and corresponds to a foot switch in the case of dental equipment. VR2 represents a variable resistor for throttle, which is connected to the switch SW1. The resistors R1 and R2, variable resistors VR1 and VR2 and capacitor C1 are used to provide a time delay so that the change of the speed setting voltage is not faster than the response speed of motor rotation. The capacitor C1 is charged via the variable resistor VR2 and the resistor R2. Via the variable resistor VR2, a speed command signal is fed to the differential amplifier circuit 3 in the circuit diagram. The detection signal from the speed detection circuit 2 in the circuit diagram is also fed to the differential amplifier circuit 3. A control signal is fed from the gain control circuit 4 to the motor drive circuit 5 in the circuit diagram according to the difference between the two signals fed to the amplifier Q2 of the differential amplifier circuit 3. On the motor side, a rotor position sensor 6 such as a magnetic sensor picks up a sinusoidal position signal. This signal is fed to the gain control circuit 4 via the position signal amplifier circuit 7 which includes an amplifier Q1 so that the control signal fed to the motor drive circuit is synchronized in accordance with the rotation position of the rotor. The comparator Q3 of the sudden stop circuit 8 in the circuit diagram compares its reference voltage VR with the setting voltage fed from the speed setting circuit 1. When the setting voltage exceeds the reference voltage VR, the capacitor C1 is discharged and a locking pulse signal is generated. This pulse signal is applied to at least one motor coil 9. D1 represents a diode used to protect the capacitor C1. D2 and D3 represent diodes used to prevent the circuit for malfunctioning due to counter current flow.

The function of the embodiment of the present invention is explained below referring to FIG. 2. When the on/off switch SW1 is set to on, the voltage of the switch fed to the sudden stop circuit 8 as shown in FIG. 1 is setting to the setting voltage VS1 (4 V) and compared with the reference voltage VR (8 V) by the comparator Q3. Since the reference voltage is higher than the setting voltage at this time, the output of the comparator is high and the diode D2 is cut-off. Then the capacitor C1 is charged through R1, VR1, SW1, VR2 and R2 and the motor rotates. When the switch SW1 is turned off, the voltage from the variable resistor VR1 which fed to the comparator sudden stop circuit B rises to 12 V. Thus the comparator Q3 is inverted, the capacitor C1 is discharged through diode D2 and the discharge voltage VD shown in FIG. 2 is fed to the differential amplifier circuit 3. As a result, the locking pulse signal voltage VR is generated from the output of the gain control circuit 4 and applied to at least one motor coil 9 via the motor drive circuit 5. By the application of the pulse signal, the motor coil 9 functions as an electromagnet and the generated electromagnetic force brakes the motor rotor. (For easy understanding, thin lines in FIG. 2 represent the signal waveforms obtained when the switch SW1 is turned on and the thick lines represent those obtained when the switch is turned off). The width and duration of the locking pulse signal are greater as the motor speed is higher, and the stopping time of the rotor is almost constant regardless of the motor speed.

When the capacitor C1 is completely discharged, no locking pulse signal is applied to the motor coil 9. Thus the rotor is released and can be rotated by hand as desired.

As described above, the embodiment of the present invention uses a compact circuit composed of a small quantity of components, that is, the comparator Q3 and its peripheral components, i.e., resistors R1 and VR1, capacitor C1 and diodes D1-D3. In addition, the circuit applies a large braking force to stop the motor in an extremely short time.

It is further understood by those skilled in the art that the foregoing description is a preferred embodiment of the disclosed circuit and that various changes and modifications may be made in the invention without departing from the spirit and scope thereof.

I claim:

1. A sudden stop circuit for a brushless micromotor comprising a means for detecting the off state of an on/off switch of said brushless micromotor and a means for applying a locking pulse signal to at least one motor coil for a specified period depending on the off state detection signal generated by said detection means, said means for applying a locking pulse signal comprising a capacitor which is discharged when the off state of said on/off switch is detected by said detection means and said locking pulse signal having a voltage level corresponding to the discharge voltage of said capacitor is generated and applied to at least one motor coil via a brushless motor drive circuit by said means for applying a locking pulse signal, whereby said motor rotor is braked by the electromagnetic force generated in said motor coil by said locking pulse signal.

* * * * *